United States Patent Office 3,395,036
Patented July 30, 1968

3,395,036
PROCESS FOR POST-FINISHING PIGMENTED GLASS FABRIC
James Kermit Campbell, Midland, Mich., assignor to Dow Corning Corporation, Midland, Mich., a corporation of Michigan
No Drawing. Filed May 17, 1965, Ser. No. 456,544
2 Claims. (Cl. 117—126)

ABSTRACT OF THE DISCLOSURE

A post-finish process for pigmented glass fabric rendering colored fabric washable, improving wet and dry abrasion resistance and rendering fabric hydrophobic; the post-finishing composition consisting essentially of (a) organosilane, (b) hydrolysis catalyst and (c) water, the pH of said post-finish being from 2.5 to 6.0. An illustrative example of formulation being (a) methyltrimethoxysilane; (b) zirconium tetraacetate and zinc acetate; (c) water with acetic acid.

---

This application relates to a method for permanent fixing of pigments on glass fabric through the application of a treating solution, following the pigmenting of the glass fabric.

It is well known that piments do not adhere to glass fabric in a satisfactory manner, even when an organic binder is used. They are easily removed by washing the fabric.

The post-finishing composition of this invention is highly effective in producing the permanent adhesion of pigments to glass fabric, rendering the colored fabric washable. Further advantages of the composition of this invention are that it renders the fabric on which it is placed hydrophobic, and that it improves both the wet and dry abrasion resistance of the pigment on the fabric. The color of the fabric is generally not altered by the above treatment.

This application relates to a post finish for pigmented glass fabric consisting essentially of (a) from 1 to 8 parts by weight of $RSiX_3$ where R is selected from the group consisting of monovalent aliphatic hydrocarbon radicals of no more than 3 carbon atoms, monovalent aryl and alkaryl radicals, and beta-perfluoroalkylethyl radicals; and X is selected from the group consisting of alcoholate radicals, lower acyloxy radicals, lower dihydrocarbyl-substituted isocyanoxy radicals, and the isocyanate radicals, (b) from 0.5 to 4 parts by weight of a compound selected from the group consisting of (1) $MX_4$, where M is selected from the group consisting of titanium and zirconium and X is defined above, and (2) a reaction product of (1) with a beta-diketoester or a beta-diketone, the ratio of the weights of (a) to (b) being from 1:1 to 10:1, and (c) 100 parts by weight of water, the pH of said post finish being from 2.5 to 6.0.

R can be any monovalent hydrocarbon radical as described above such as methyl, ethyl, isopropyl, ethynyl, or vinyl. R can also be any monovalent aryl or alkaryl radical, such as phenyl, xenyl, naphthyl, or tolyl. Finally, R can be any beta-perfluoroalkylethyl radical such as 3,3,3-trifluoropropyl, $C_5F_{11}CH_2CH_2$—, $C_9F_{19}CH_2CH_2$— or $C_{12}F_{25}CH_2CH_2$—.

By "alcoholate radical" is meant any organic radical having a free valence of the form $\equiv CO$—, the radical being derived from an alcohol, which in the broad sense is any organic compound with a $\equiv COH$ bond.

X can be alcoholate radical, e.g. any alkoxy or alkoxyalkoxy radical such as methoxy, ethoxy, isobutoxy, 2-ethylhexoxy, beta-methoxyethoxy, or beta-ethoxyethoxy; alkyleneoxy radicals such as ethylene glycolate or glycerate, and substituted alcoholates such as $NH_2CH_2CH_2O$— or $(NH_2)_3CCH_2O$—; any lower acyloxy radical such as formate, acetate, lactate or butyrate; and any isocyanoxy radical as described above such as

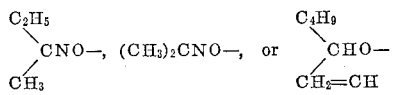

(b) can be the reaction product of $MX_4$ with beta diketones or beta diketoesters which have the formula

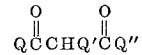

where Q is any monovalent aliphatic hydrocarbon radical, Q' is hydrogen or any monovalent aliphatic hydrocarbon radical, and Q" is a monovalent aliphatic hydrocarbon radical or an aliphatic hydrocarbonoxy radical. Examples of such reaction products where M is zirconium are listed in U.S. Patent 2,884,393, and a method of preparation of these reaction products is shown.

The corresponding titanium reaction products are analogous to the zirconium compounds of the above patent. Examples of both of these reaction products are

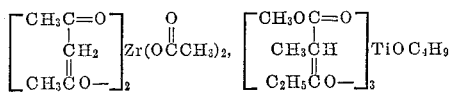

or

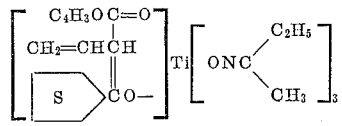

Other specific examples of organotitanium and zirconium compounds which are operative as ingredient (b) include tetraethyl titanate, tetraisopropyl zirconate, tetra-n-butyl titanate, tetra-2-ethylhexyl titanate, tetraphenyl titanate, tetraoctadecyl zirconate, tetra-12-octadecenyl titanate, triethanolamine titanate, $[(HOC_3H_6)_2N(CH_2)_3O]_2Ti[OCH(CH_3)_2]_2$, $[(CH_3CH_2)_2N(CH_2)_2O]_4Zr$ $[C_6H_{13})_2N(CH_2)_6O]_2Ti[OCH_2CH(CH_3)_2]_2$ $[C_4H_9NH(CH_2)_4O]_4Ti$, $(HOCH_2CH_2NHCH_2O)_4Ti$ ethylene glycol titanate, $Ti[OCH_2CH(CH_2CH_3)CH(OH)CH_2CH_2CH_3]_4$ tetra(methoxyethyl) titanate, bis(acetylacetonyl)diisopropyl titanate,

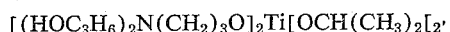

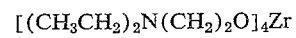

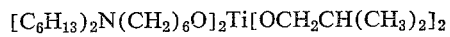

$(CH_3COOCH_2O)_4Ti$, diisopropyldiacetoxy titanate, and

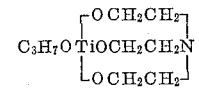

Ingredients (a) and (b) can be polymeric as in the case where X is the alcoholate residue of glycerine or ethylene glycol.

Small amounts of additional ingredients may be mixed with the above formulation without departing from the spirit of this invention. Acids such as acetic, formic, or phosphoric acid can be added to raise the pH to a more desirable range, or ammonia can be added to lower the pH. Dyes or pigments can be directly placed in the treating composition to dye the fabric and fix the dye in one step. Also, the presence of a small amount of zinc acetate in the mixture tends to render the glass fabric more water-repellent.

The composition of this invention is applied to pigmented glass fabric simply by dipping the fabric in a bath of the composition, and drying the dipped fabric at about 300 to 500° F. for about 1 to 5 minutes. The preferred temperature range is from 350° to 450° F.

Alternatively, the composition of this invention can be sprayed on the fabric or applied in any other suitable manner, the drying process being as shown above.

It is not absolutely required that the treated glass fabric be heat-cured. The composition of this invention will cure on the fabric in a matter of hours at room temperature.

The nature of the pigment on the glass is not critical; many methods of coloring glass fabric are well known, and many different binders can be used. An acrylic latex is highly suitable as a binder for the pigment, as are acrylonitrile - butadiene-styrene, polyvinylbutyral, and other organic resins.

As a preferred embodiment, this application relates to a post finish for pigmented glass fabric consisting essentially of (a) from 1 to 3 parts by weight of $R'Si(OR'')_3$, where $R'$ is selected from the group consisting of methyl, phenyl, and vinyl, and $R''$ is selected from the group consisting of methyl and ethyl, (b) from 0.4 to 1.5 parts by weight of zirconium acetate, (c) 100 parts by weight of water, and (d) from 0.1 to 0.3 part by weight of zinc acetate, there being sufficient acetic acid present to impart to the mixture a pH of 3.0 to 6.0, and there being no more of (b) present than (a).

It is preferred for R to be methyl. Compositions where R is methyl yield the greatest wash-durability.

Compositions where R is phenyl or propyl impart a softer hand to the glass fabric than when R is methyl. If a very stiff hand is desired, R should be vinyl, in whole or in part.

Ingredients (a) and (b) can each consist of mixtures: e.g. ingredient (a) can be an equimolar mixture of methyltriacetoxysilane and 3,3,3 - trifluoropropyltriethoxysilane.

The following examples are illustrative only and should not be construed as limiting the invention, which is properly delineated in the appended claims.

Example 1

(a) To 100 parts by weight of water there was added 2 parts of methyltrimethoxysilane, 0.83 part of zirconium tetraacetate, 0.16 part of zinc acetate, and 0.21 part of acetic acid.

Glass fabric which had been pigmented with an inorganic pigment and an ethyl acrylate binder was dipped in this mixture and pressed at 15 p.s.i. to remove excess solution. The fabric was then air dried and cured for 1½ minutes at 380° F.

The cured fabric was found to be moderately water-repellent. The fabric was machine-washed with Tide detergent three times with only a trace of fading of the pigment coating.

The cured fabric exhibited excellent abrasion resistance, in that the pigment coating was not easily removed by rubbing.

(b) Untreated, pigmented glass fabric exhibited low water-repellency, and the pigment was easily removable by either washing or rubbing.

Example 2

(a) To 100 parts by weight of water there was added 1 part of methyltrimethoxysilane, 0.83 part of zirconium tetraacetate, 0.16 part of zinc acetate, and 0.21 part of acetic acid.

(b) To 100 parts by weight of water there was added 2 parts of methyltrimethoxysilane, 0.41 part of zirconium tetraacetate, 0.08 part of zinc acetate, and 0.20 part of acetic acid.

(c) To 100 parts by weight of water there was added 1 part of methyltrimethoxysilane, 0.41 part of zirconium tetraacetate, 0.08 part of zinc acetate, and 0.20 part of acetic acid.

Samples of pigmented glass fabric were dipped into these mixtures and cured in the manner of Example 1(a), yielding treated glass fabric having properties similar to the fabric of Example 1(a).

Example 3

(a) To 100 parts by weight of water there was added 1.5 parts of methyltrimethoxysilane, 0.5 part of n-propyltrimethoxysilane, 0.83 part of zirconium tetraacetate, 0.16 part of zinc acetate, and 0.21 part of acetic acid.

(b) To 100 parts by weight of water there was added 1.5 parts of methyltrimethoxysilane, 0.5 part of phenyltrimethoxysilane, 0.83 part of zirconium tetraacetate, 0.16 part of zinc acetate, and 0.21 part of acetic acid.

Samples of pigmented glass fabric were dipped into these mixtures and cured in the manner of Example 1(a), yielding treated glass fabric having properties similar to the fabric of Example 1(a).

The fabric treated with the mixture of 3(a) had a softer hand than the fabric of Example 1(a).

Example 4

When 100 parts by weight of water are added to 4 parts of

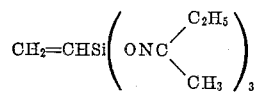

1 part of tetraethyltitanate, and sufficient $CO_2$ to impart a pH of 5.0 to the mixture, a glass fabric finishing composition is formed.

Glass fabric which had been pigmented with an inorganic pigment and an acrylonitrile-butadiene-styrene binder was dipped in this mixture, dried, and cured at 400° F. for 3 minutes.

The pigmented glass fabric was washable without fading, and the pigment exhibited good abrasion resistance.

Example 5

Equivalent results are obtained when 100 parts by weight of water are mixed with 6 parts of 3,3,3-trifluoropropyltrimethoxysilane, 3 parts of $Zr(OCH_2CH_2OCH_3)_4$, and 0.01 part of HCl, and the resulting composition is used as in Example 4.

Example 6

Equivalent results are obtained when 100 parts by weight of water are mixed with 3 parts of

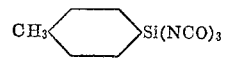

and 3 parts of titanium tetraacetate, and the resulting composition is used as in Example 4.

Example 7

Equivalent results are obtained when 100 parts by weight of water are mixed with 1 part of $$CH_3Si[OCH_2CH_2N(CH_3)_2]_3$$

and 1 part of

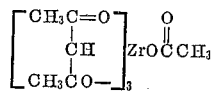

and the resulting composition is used as in Example 4.

That which is claimed is:
1. A process for post-finishing glass fabrics comprising applying to pigmented glass fabric a composition consisting essentially of
   (a) from 1 to 8 parts by weight of $RSiX_3$ where R is selected from the group consisting of monovalent aliphatic hydrocarbon radicals of no more than 3 carbon atoms and phenyl, and X is an alkoxy radical,
(b) from 0.5 to 4 parts by weight of zirconium acetate, and
(c) 100 parts by weight of water, the pH of said post-finish mixture being from 2.5 to 6.0, and thereafter allowing said composition to cure.

2. The process of claim 1 where from 0.1 to 0.3 part by weight zinc acetate is present.

References Cited

UNITED STATES PATENTS

| | | | |
|---|---|---|---|
| 3,244,541 | 4/1966 | Fain | 106—2 |
| 3,313,649 | 4/1967 | Vescia et al. | 117—161 |
| 2,919,172 | 12/1959 | Lawsberg | 8—8 |
| 2,919,173 | 12/1959 | Roff | 8—8 |
| 2,927,870 | 3/1960 | Beutler | 260—429.3 |
| 2,938,812 | 5/1960 | Mazocchi | 117—124 |
| 3,231,404 | 1/1966 | Ferrigno | 106—287 |
| 3,258,382 | 6/1966 | Vincent | 117—126 |
| 3,262,810 | 7/1966 | Campbell | 117—126 |
| 3,262,830 | 7/1966 | Vincent | 117—126 |

JAMES A. SEIDLECK, *Primary Examiner.*

T. MORRIS, *Assistant Examiner.*